(12) United States Patent
Palamara et al.

(10) Patent No.: US 10,070,320 B2
(45) Date of Patent: Sep. 4, 2018

(54) SELECTING A RADIO ACCESS TECHNOLOGY BASED ON RADIO FREQUENCY SPECTRUM BANDS SUPPORTED BY A USER DEVICE AND BY A ROAMING NETWORK

(71) Applicant: Verizon Patent and Licensing Inc., Arlington, VA (US)

(72) Inventors: Maria E. Palamara, Denville, NJ (US); Jignesh Patel, Haltom City, TX (US); Joseph Peter Kuhn, III, Hamilton, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 286 days.

(21) Appl. No.: 14/862,527

(22) Filed: Sep. 23, 2015

(65) Prior Publication Data

US 2017/0086197 A1    Mar. 23, 2017

(51) Int. Cl.
*H04W 16/14* (2009.01)
*H04W 48/18* (2009.01)
*H04W 16/00* (2009.01)

(52) U.S. Cl.
CPC ........... *H04W 16/14* (2013.01); *H04W 48/18* (2013.01); *H04W 16/00* (2013.01)

(58) Field of Classification Search
CPC ..... H04W 48/18; H04W 48/08; H04W 16/14; H04W 16/00; H04W 48/00

USPC ......................................................... 370/329
See application file for complete search history.

(56) References Cited

U.S. PATENT DOCUMENTS

| | | | | |
|---|---|---|---|---|
| 2006/0229080 A1* | 10/2006 | Khan | ............... | H04W 48/18 455/450 |
| 2013/0079001 A1* | 3/2013 | Edara | ............... | H04W 52/0254 455/433 |
| 2013/0137475 A1* | 5/2013 | Rousu | ............... | H04W 72/0453 455/509 |
| 2016/0095018 A1* | 3/2016 | Vajapeyam | ....... | H04W 36/0005 370/331 |
| 2017/0041866 A1* | 2/2017 | Sharma | ................ | H04W 48/18 |

\* cited by examiner

*Primary Examiner* — Michael Thier
*Assistant Examiner* — Rownak Islam (57) ABSTRACT

A device may identify a first set of radio frequency (RF) spectrum bands supported by a visited public mobile network (VPMN) for a first radio access technology (RAT), and may identify a second set of RF spectrum bands supported by a user device for the first RAT. The device may compare the first set of RF spectrum bands and the second set of RF spectrum bands, and may determine whether the user device and the VPMN support a same RF spectrum band for the first RAT. The user device may be registered to use the first RAT when the user device and the VPMN support the same RF spectrum band for the first RAT, or the user device may be registered to use the second RAT when the user device and the VPMN do not support the same RF spectrum band for the first RAT.

20 Claims, 6 Drawing Sheets

SELECTING A RADIO ACCESS TECHNOLOGY BASED ON RADIO FREQUENCY SPECTRUM BANDS SUPPORTED BY A USER DEVICE AND BY A ROAMING NETWORK

BACKGROUND

A radio access technology (RAT), such as a Global System for Mobile Communication (GSM) RAT, a Universal Mobile Telecommunications System (UMTS) RAT, a Long-Term Evolution (LTE) RAT, or the like, may be associated with one or more radio frequency (RF) spectrum bands. An RF spectrum band is a section of the spectrum of radio communication frequencies (e.g., the RF spectrum band includes a range of frequencies). A network, which supports a particular RAT, may use the RAT to communicate with devices associated with the network using frequencies (e.g., carrier frequencies) within the one or more RF spectrum bands.

DETAILED DESCRIPTION OF PREFERRED EMBODIMENTS

The following detailed description of example implementations refers to the accompanying drawings. The same reference numbers in different drawings may identify the same or similar elements.

A RAT, such as GSM RAT, a UMTS RAT, an LTE RAT, or the like, may be associated with one or more RF spectrum bands. A network, which supports a particular RAT, may use the RAT to communicate with devices associated with the network using frequencies within the one or more RF spectrum bands. In some implementations, such as with a network that supports an LTE RAT, a RAT may be associated with a primary coverage band (e.g., a spectrum band used as a primary band for communications associated with a user device, such as voice calls or data services) and a capacity band (e.g., a spectrum band that can be used to increase capacity for communications associated with a user device). In some implementations, the primary coverage band may cover a larger geographic area and penetrate structures more successfully than the capacity band. Thus, the capacity band may be a backup band for the primary coverage band.

A user device may be configured to communicate using one or more RF spectrum bands. If a user device is associated with a first network operator (e.g., a network operator in the United States), the user device may be able to communicate using one or more RF spectrum bands associated with the first network operator. However, the user device may have issues communicating reliably via a network associated with a second network operator (e.g., a network operator in Europe) because the user device may not be able to communicate using all necessary RF spectrum bands associated with the second network operator. For example, the user device may have issues using a RAT service when the user device is roaming in a visited public mobile network (VPMN) (e.g., as compared to a home public mobile network (HPMN), which is a network with which the user device has a subscription) because the user device is not capable of communicating using an RF spectrum band (e.g., the primary coverage band) associated with the VPMN. This is particularly of concern for voice communications, as calls may be dropped at coverage borders if only the capacity band, and not the primary coverage band, is supported.

Implementations described herein allow a user device or a network device in the cellular network to determine whether the user device will use a particular RAT, such as an LTE RAT, when roaming on a visited public mobile network (VPMN) by comparing RF spectrum bands supported by the VPMN to RF spectrum bands supported by the user device. By determining whether to use the particular RAT to communicate via the VPMN, the user device (or the network device) saves processor and network resources associated with having to switch from one RAT to another mid-call. Furthermore, the risk of losing a call is reduced, and the best possible quality of service can be provided to the user device by allowing higher quality RAT services (e.g., a voice over LTE (VoLTE) service) to be used when efficient and possible based on the comparison of RF spectrum bands supported by the user device and RF spectrum bands supported by the VPMN.

Figure 1A:
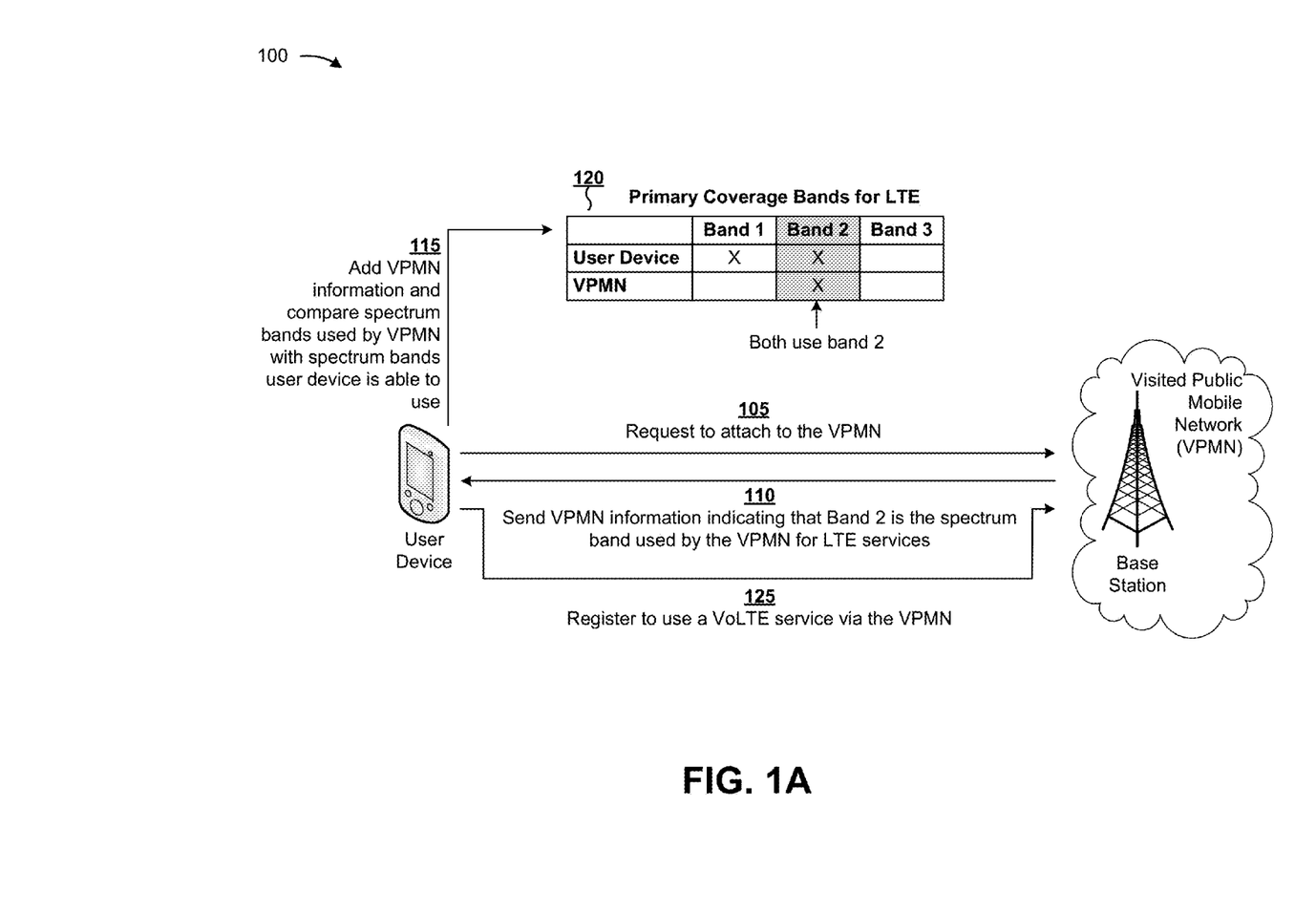
FIGS. 1A-1C are diagrams of an overview of an example implementation described herein.

FIG. 1A is a diagram of an example implementation 100 described herein. For the purposes of FIG. 1A, assume that a user device is roaming in a coverage area associated with a VPMN. As shown by reference number 105, assume that the user device requests to attach to the VPMN via a base station (e.g., the user device sends a request to attach to the VPMN using an LTE RAT). As shown by reference number 110, the base station of the VPMN sends the user device VPMN information indicating that the VPMN uses Band 2 for LTE communications. As an example, Band 2 may include an RF spectrum band in the range of approximately 700 megahertz (MHz).

As shown by reference number 115, the user device adds the VPMN information to a data structure that stores information associated with the RF spectrum bands that the VPMN and the user device use, and compares the information. As shown by reference number 120, the data structure identifies which primary coverage bands the user device and the VPMN are capable of using. As shown, the user device can use Band 1 and Band 2. The VPMN uses Band 2 as a primary coverage band for LTE communications. Therefore, both the user device and the VPMN can use Band 2 for an LTE RAT for LTE services, such as a VoLTE service. As shown by reference number 125, because the user device and the VPMN both support Band 2 for use with the LTE RAT, the user device registers to use the VoLTE service via the VPMN. In this way, the user device may determine whether to request a particular RAT, such as an LTE RAT, based on comparing RF spectrum bands supported by the user device and RF spectrum bands supported by a VPMN on which the user device is roaming.

Figure 1B:
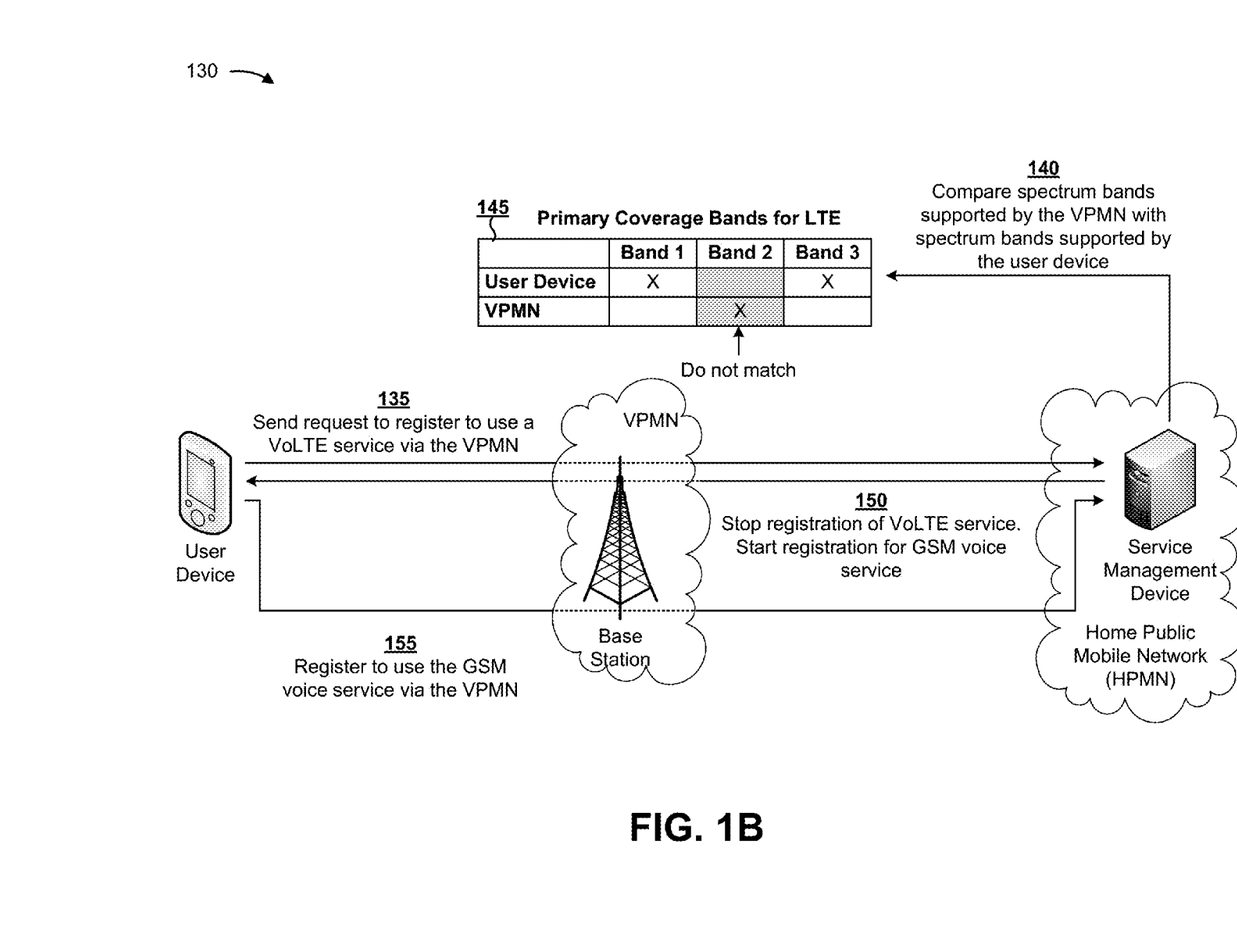

FIG. 1B is a diagram of another example implementation 130 described herein. As shown by FIG. 1B, and by reference number 135, assume that a user device sends a request, via a base station of a VPMN, to register to use a VoLTE service after the user device has attached to the VPMN. As shown, the base station forwards the request to register to a service management device, which is part of a HPMN associated with the user device. As shown by reference number 140, the service management device compares RF spectrum bands supported by the VPMN and RF spectrum bands supported by the user device. The service management device has access to a data structure that stores information associated with the user device, which is associated with the HPMN, and associated with the VPMN, which is a roaming partner of the HPMN.

As shown by reference number 145, the VPMN uses Band 2 as a primary coverage band for LTE communications. The user device is capable of using Band 1 and Band 3, but not Band 2. Therefore, the user device is not capable of using the primary coverage band associated with an LTE RAT used by the VPMN (e.g., Band 2). In some implementations, the service management device may also compare RF spectrum bands that the user device is capable of using to RF spectrum bands used by the VPMN for other RATs, such as GSM.

As shown by reference number 150, the service management device sends a message to the user device based on comparing the RF spectrum bands used by the VPMN with the RF spectrum bands supported by the user device. The message stops or prevents the registration of the user device for VoLTE service via the VPMN. Additionally, the message commands the user device to start registration for a GSM voice service via the VPMN. As shown by reference number 155, the user device registers to use the GSM voice service via the VPMN, rather than the VoLTE service, based on the message from the service management device. In this way, the service management device may instruct the user device regarding whether to use a particular RAT, such as an LTE RAT, based on comparing RF spectrum bands supported by the user device and RF spectrum bands supported by a VPMN on which the user device is roaming.

Figure 1C:
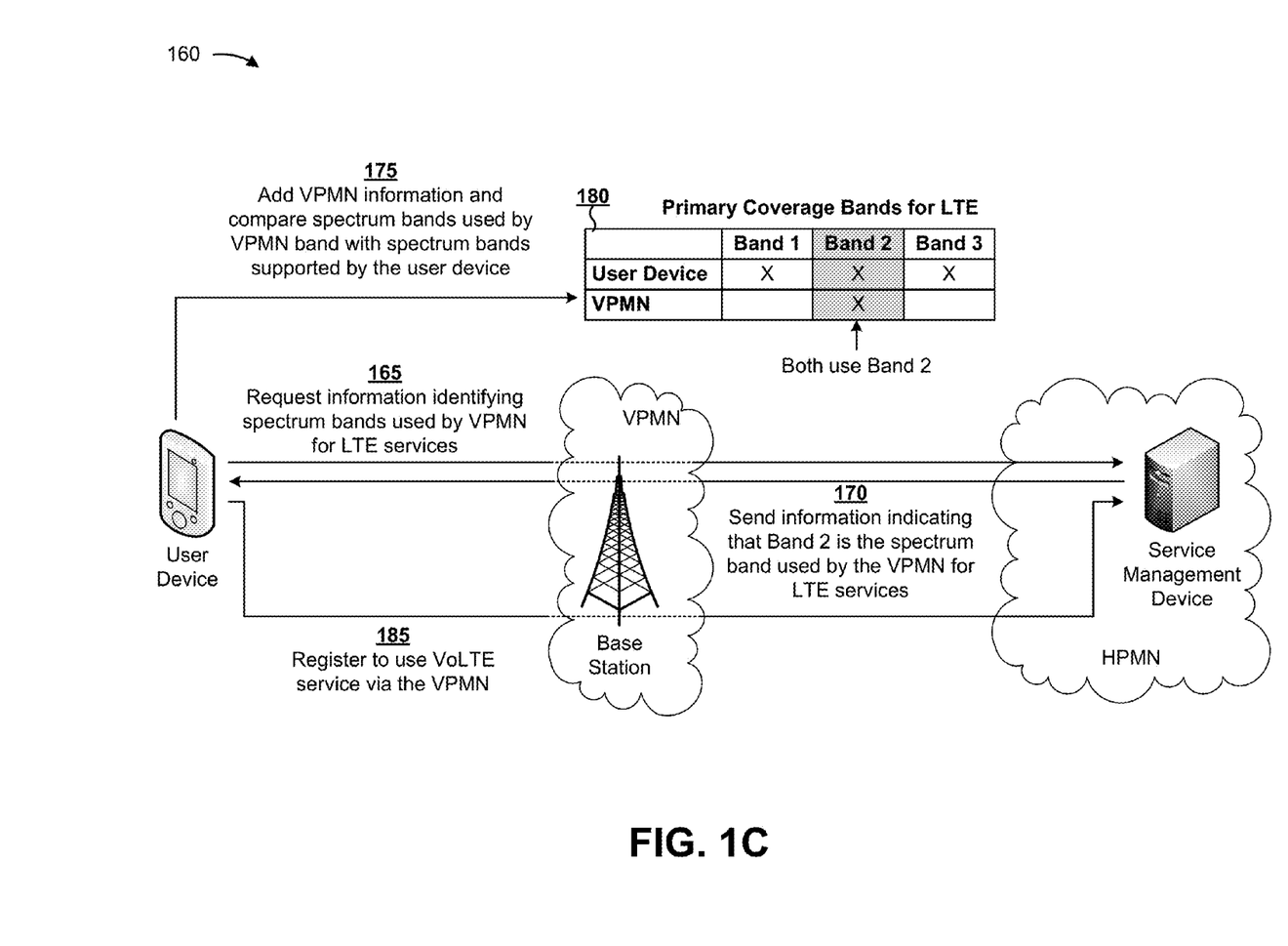

FIG. 1C is a diagram of another example implementation 160 described herein. As shown in FIG. 1C, assume that a user device is in communication with a VPMN. As shown by reference number 165, assume that the user device requests, via a base station of the VPMN, information identifying RF spectrum bands used by the VPMN for LTE services. The VPMN forwards the request for information to the service management device, which is part of an HPMN associated with the user device. As shown by reference number 170, the service management device sends information indicating that Band 2 is the spectrum band used by the VPMN for LTE services. The service management device uses a data structure, that stores information associated with roaming partners, to determine that the VPMN uses Band 2.

As shown by reference number 175, the user device adds information indicating that Band 2 is the spectrum band used by the VPMN to a data structure. The user device compares the RF spectrum bands used by the VPMN with RF spectrum bands supported by the user device. As shown by reference number 180, Band 2 is the primary coverage band used by the VPMN for LTE services. The user device is capable of using Band 1, Band 2, and Band 3 for communications. Therefore, the user device and the VPMN can both use Band 2 for an LTE service, such as a VoLTE service. As shown by reference number 185, because the user device can use a spectrum band associated with the VoLTE service provided by the VPMN, the user device registers to use the VoLTE service via the VPMN. In this way, the user device may use information from the service management device to determine whether to request a particular RAT, such as an LTE RAT, based on comparing RF spectrum bands supported by the user device and RF spectrum bands supported by a VPMN on which the user device is roaming.

Implementations described herein allow a user device or a service management device, associated with an HPMN of the user device, to determine whether the user device will use a particular RAT when the user device is roaming on the VPMN. This determination may be made by comparing the RF spectrum bands associated with the VPMN to RF spectrum bands that the user device is capable of using to communicate. By determining whether to use the particular RAT to communicate via the VPMN, the user device or the service management device saves processor and network resources associated with having to switch from one RAT to another mid-call. Furthermore, the risk of losing a call is reduced, and the best possible quality of service can be provided to the user device by allowing higher quality RAT services (e.g., a VoLTE service) to be used when efficient and possible based on the comparison of RF spectrum bands supported by the user device and RF spectrum bands supported by the VPMN.

Figure 2:
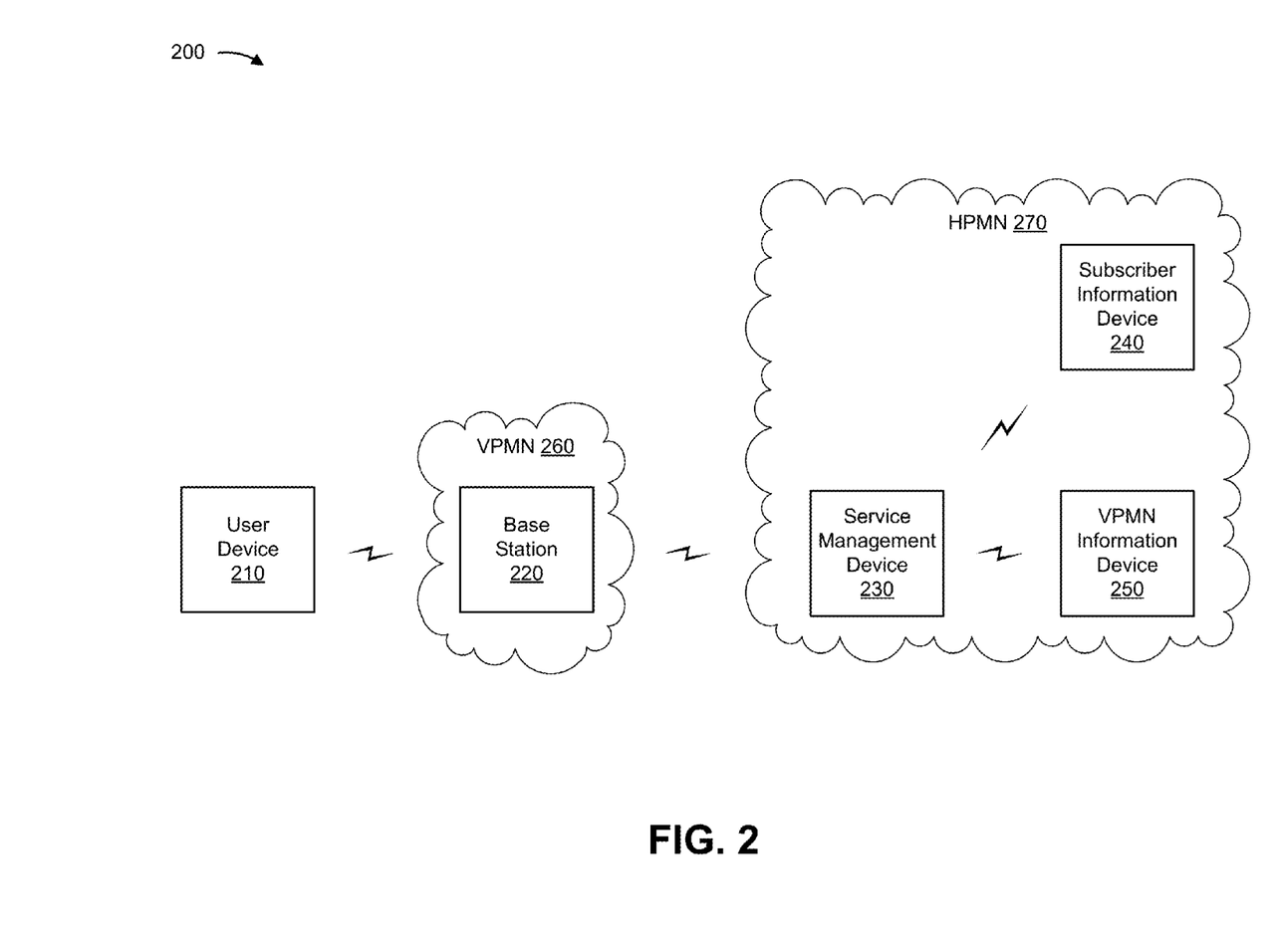
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a base station 220, a service management device 230, a subscriber information device 240, a VPMN information device 250, a VPMN 260, and/or an HPMN 270. Devices of environment 200 may interconnect via wired connections, wireless connections, or a combination of wired and wireless connections.

User device 210 may include one or more devices capable of communicating with base station 220 and/or a network (e.g., VPMN 260 and/or HPMN 270). For example, user device 210 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, and/or a similar device. User device 210 may send traffic to and/or receive traffic from base station 220. In some implementations, user device 210 may be associated with HPMN 270 through a subscription.

Base station 220 may include one or more devices capable of transferring traffic, such as audio, video, text, and/or other traffic, destined for and/or received from user device 210. In some implementations, base station 220 may include an Evolved Node B (eNB) associated with VPMN 260. Base station 220 may send traffic to and/or receive traffic from user device 210 via an air interface. In some implementations, base station 220 may include a small cell base station, such as a base station of a microcell, a picocell, and/or a femtocell. Base station 220 may support one or more RATs, such as a GSM RAT, a UMTS RAT, an LTE RAT, or the like.

Service management device 230 may include one or more devices capable of receiving, generating, storing, processing, and/or providing information related to user device 210 and VPMN 260. For example, service management device 230 may include a computing device, such as a server (e.g., a web server, a database server, etc.), a network device (e.g., a traffic transfer device, a gateway, a router, a switch, a firewall, a hub, etc.), or a similar device.

Subscriber information device 240 may include one or more devices capable of receiving, generating, storing, processing, and/or providing information associated with user devices 210 associated with HPMN 270. For example, subscriber information device 240 may include a computing device, such as a server (e.g., a web server, a database server, etc.), a network device, or a similar device. In some implementations, subscriber information device 240 may include a home subscriber server (HSS), a home location register (HLR), or the like.

VPMN information device 250 may include one or more devices capable of receiving, generating, storing, processing, and/or providing information associated with VPMN 260. For example, VPMN information device 250 may include a computing device, such as a server (e.g., a web server, a database server, etc.), a network device, or a similar device. In some implementations, VPMN information device 250 may store information that identifies one or more RF spectrum bands supported by VPMN 260.

VPMN 260 may include one or more wired and/or wireless networks. For example, VPMN 260 may include a cellular network, such as a second generation (2G) network (e.g., a GSM network), a third generation (3G) network (e.g., a UMTS network), a fourth generation (4G) network (e.g., an LTE network), a fifth generation (5G) network, or the like. Additionally, or alternatively, VPMN 260 may include a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks. In some implementations, VPMN 260 may be a network that user device 210 can communicate with when roaming outside of an area covered by HPMN 270.

HPMN 270 may include one or more wired and/or wireless networks. For example, HPMN 270 may include a cellular network, such as a second generation (2G) network (e.g., a GSM network), a third generation (3G) network (e.g., a UMTS network), a fourth generation (4G) network (e.g., an LTE network), a fifth generation (5G) network, or the like. Additionally, or alternatively, HPMN 270 may include a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks. In some implementations, HPMN 270 may be associated with user device 210. For example, HPMN 270 may be a home network with which user device 210 has a subscription.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
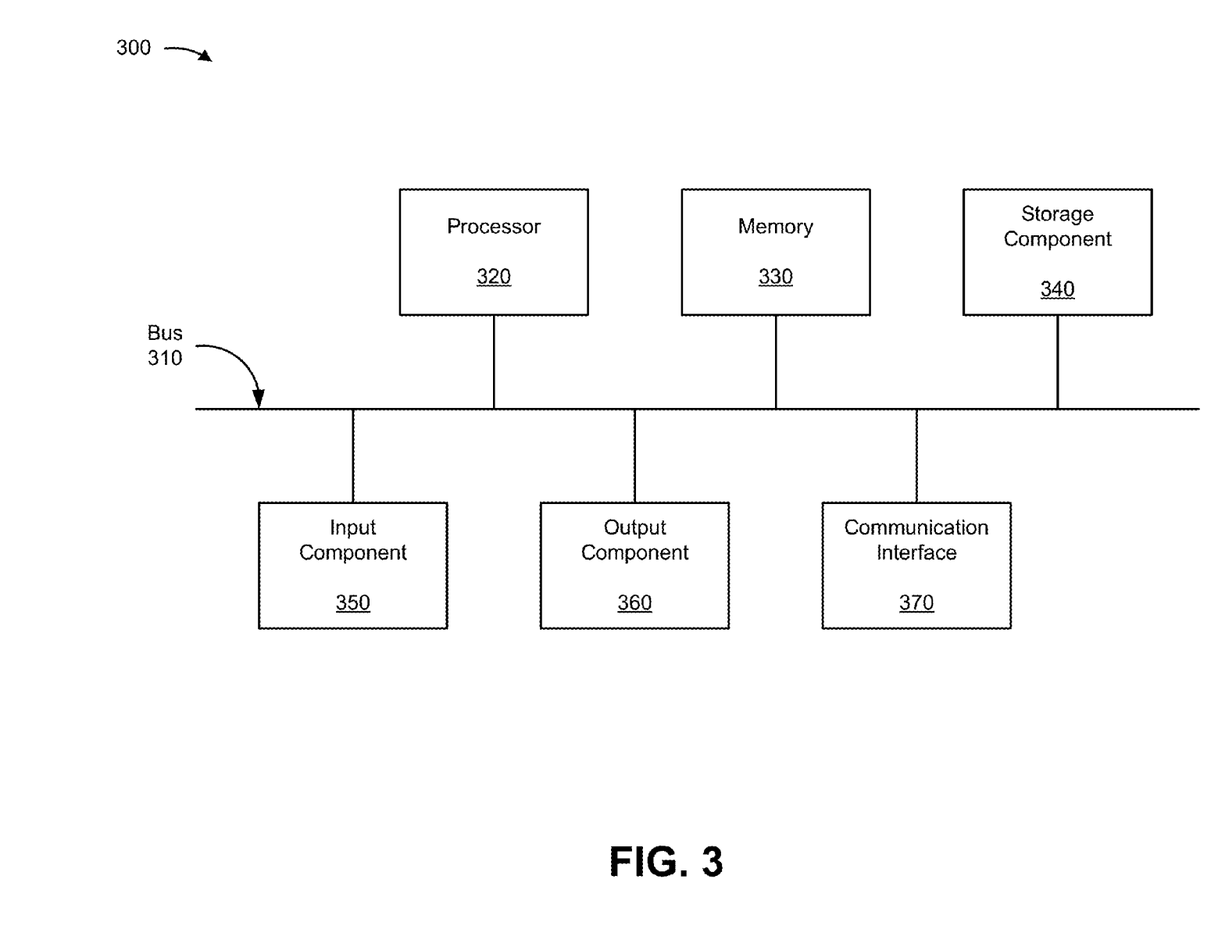
FIG. 3 is a diagram of example components of one or more devices of FIG. 2.

FIG. 3 is a diagram of example components of a device 300. Device 300 may correspond to user device 210, base station 220, service management device 230, subscriber information device 240, and/or VPMN information device 250. In some implementations, user device 210, base station 220, service management device 230, subscriber information device 240, and/or VPMN information device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a baseband processing unit (BPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
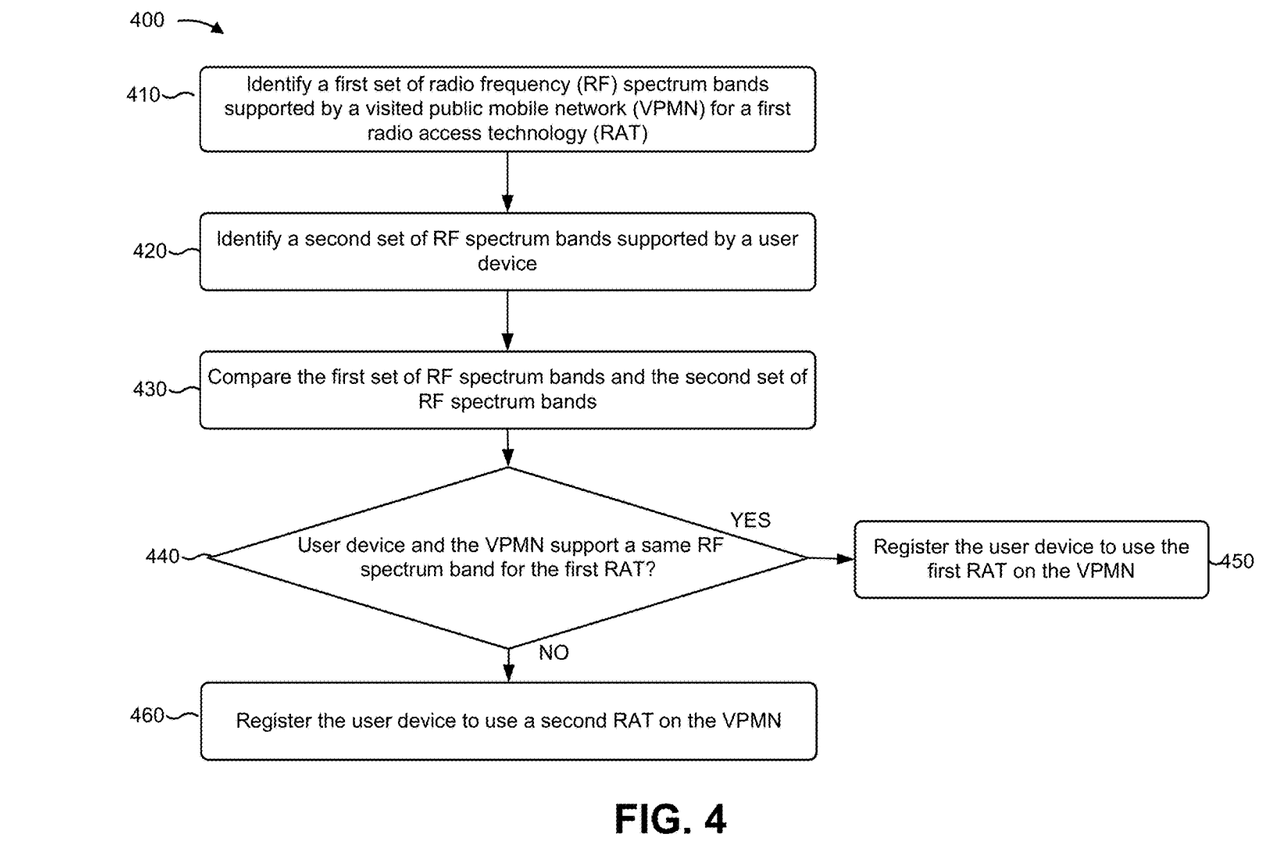
FIG. 4 is a flow chart of an example process for selecting a radio access technology (RAT) based on radio frequency spectrum bands supported by a user device and by a roaming network.

FIG. 4 is a flow chart of an example process 400 for selecting a radio access technology (RAT) based on radio frequency (RF) spectrum bands supported by a user device and by a roaming network. In some implementations, one or more process blocks of FIG. 4 may be performed by user device 210. In some implementations, one or more process blocks of FIG. 4 may be performed by another device or a group of devices separate from or including user device 210, such as base station 220, service management device 230, subscriber information device 240, and/or VPMN information device 250.

As shown in FIG. 4, process 400 may include identifying a first set of radio frequency (RF) spectrum bands supported by a visited public mobile network (VPMN) for a first radio access technology (RAT) (block 410). For example, user device 210 may identify a first set of spectrum bands used by VPMN 260 for a first RAT. VPMN 260 may be assigned (e.g., by an authority that assigns RF spectrum bands, such at the Federal Communications Commission (FCC) of the United States) and may use the first set of spectrum bands to provide network access via the first RAT. For example, for an LTE RAT, VPMN 260 may be assigned a primary coverage band and one or more capacity bands. The primary coverage band may include an RF spectrum band used as a primary band for communications associated with user device 210. A capacity band may include an RF spectrum band that can be used to increase capacity for communications associated with user device 210.

VPMN 260 may include a roaming network to which user device 210 is not subscribed, but that user device 210 may use for network access. User device 210 may be able to use VPMN 260 for services (e.g., voice services, data services, etc.) because of an agreement between an operator of VPMN 260 and an operator of HPMN 270 (e.g., to which user device 210 is subscribed) that allows user devices 210 to access the services.

A RAT may include any technology in which the underlying connection method for devices using the technology is a radio based communication network (e.g., VPMN 260, HPMN 270, etc.). For example, a RAT may include an LTE RAT, a GSM RAT, a UMTS RAT, or the like. A RAT may be used for services, such as a voice service (e.g., VoLTE) and/or a data service. In some implementations, the first RAT may be a RAT that offers the best quality of service and/or the most features, such as an LTE RAT. User device 210 may be attempting to use the first RAT because of additional capabilities associated with the first RAT.

In some implementations, user device 210 may be attempting to use the first RAT by attempting to attach to a RAT network (e.g., a network included in VPMN 260) associated with the first RAT. For example, user device 210 may send base station 220 an initial message (e.g., an attachment request), to begin attachment to an LTE network, that includes basic information associated with user device 210. In some implementations, user device 210 may be attempting to use the first RAT by sending messages to initiate the setup of the first RAT or by requesting to register for a RAT service (e.g., VoLTE). For example, once user device 210 is allowed to attach to the RAT network, user device 210 may attempt to use the RAT service by sending messages to initiate the RAT service including messages associated with supported services, quality of service, and initial setup information (e.g., such as an access point name (APN)). Additionally, or alternatively, once user device 210 is allowed to attach, user device 210 may attempt to use the first RAT, by attempting to register for the RAT service (e.g. by sending a request to register).

In some implementations, user device 210 may identify a first set of RF spectrum bands used by VPMN 260. For example, user device 210 may identify the first set of RF spectrum bands by receiving information, broadcast by base station 220, that identifies the first set of RF spectrum bands associated with VPMN 260. In other words, base station 220, associated with VPMN 260, may transmit information that identifies the first set of RF spectrum bands supported by VPMN 260, and user device 210 may receive this information.

In some implementations, user device 210 may identify the first set of RF spectrum bands by sending a request, to service management device 230, to identify the first set of RF spectrum bands used by VPMN 260 in association with the first RAT. For example, user device 210 may send the request to base station 220 of VPMN 260, which may send the request via VPMN 260 to HPMN 270 in which service management device 230 resides. In turn, service management device 230 may send, to VPMN information device 250, information that identifies VPMN 260. VPMN information device 250 may identify the first set of RF spectrum bands, supported by VPMN 260, based on the information that identifies VPMN 260 (e.g., using a data structure). Service management device 230 may receive information that identifies the first set of RF spectrum bands from VPMN information device 250, and may send the information that identifies the first set of RF spectrum bands to user device 210 (e.g., via HPMN 270, VPMN 260, and/or base station 220). Additionally, or alternatively, service management device 230 may store the information that identifies the first set of RF spectrum bands.

In some implementations, service management device 230 may identify the first set of RF spectrum bands. Service management device 230 may identify the first set of RF spectrum bands upon receiving, from user device 210, a request to register for a service associated with the first RAT (e.g., a VoLTE service) via VPMN 260. VPMN 260 may forward the request to service management device 230. Service management device 230 may identify the first set of RF spectrum bands as described above. In this way, user device 210 and/or service management device 230 may select a RAT to be used by user device 210 based on comparing RF spectrum bands supported by VPMN 260 and RF spectrum bands supported by user device 210, as described in more detail below.

As further shown in FIG. 4, process 400 may include identifying a second set of RF spectrum bands supported by a user device (block 420). For example, user device 210 may identify a second set of RF spectrum bands supported by user device 210. An RF spectrum band may be supported by user device 210 when user device 210 is capable of communicating with base station 220 using the frequencies in the RF spectrum band. When user device 210 is capable of communicating using an RF spectrum band associated with a RAT on network, user device 210 may use the RAT to communicate via the network. User device 210 may access the information identifying the second set of RF spectrum bands from memory. For example, user device 210 may be configured to support a particular set of RF spectrum bands, and may store information that identifies the particular set of RF spectrum bands that user device 210 is configured to support.

In some implementations, service management device 230 may identify the second set of RF spectrum bands when user device 210 sends a request, to service management device 230 via VPMN 260, to register for a service associated with the first RAT. The request may include a user device identifier, which allows user device 210 to be identified by service management device 230 or another device associated with HPMN 270 (e.g., subscriber information device 240). The user device identifier may include an International Mobile Station Equipment Identity (IMEI), an International Mobile Subscriber Identity (IMSI), or the like. Service management device 230 may query subscriber information device 240 using the user device identifier to determine RF spectrum bands supported by user device 210 (e.g., the second set of RF spectrum bands). Subscriber information device 240 may send information that identifies the second set of RF spectrum bands to service management device 230.

As further shown in FIG. 4, process 400 may include comparing the first set of RF spectrum bands and the second set of RF spectrum bands (block 430). For example, when user device 210 identifies the first set of RF spectrum bands and identifies the second set of RF spectrum bands, then user device 210 may compare the first set of RF spectrum bands with the second set of RF spectrum bands. In some implementations, user device 210 may compare the RF spectrum bands to determine that an RF spectrum band is in both the first set of RF spectrum bands and the second set of RF spectrum bands as described below. In this way, user device 210 may compare the RF spectrum bands when user device 210 receives information identifying the first set of RF spectrum bands from VPMN 260 with the second set of RF spectrum bands from memory, saving processor and memory resources associated with additional communications.

In some implementations, when service management device 230 identifies the first set of RF spectrum bands and identifies the second set of RF spectrum bands, service management device 230 may compare the first set of RF spectrum bands with the second set of RF spectrum bands. In this way, service management device 230 may compare the first set of RF spectrum bands with the second set of RF spectrum bands without obtaining additional information from user device 210, saving processor and memory resources.

As further shown in FIG. 4, process 400 may include determining whether the user device and the VPMN support a same RF spectrum band for the first RAT based on comparing the first set of RF spectrum bands and the second set of RF spectrum bands (block 440). For example, user device 210 may determine whether user device 210 and VPMN 260 support a same RF spectrum for the first RAT based on comparing the first set of RF spectrum bands with the second set of RF spectrum bands. In some implementations, when the first RAT is associated with a service (e.g., a VoLTE service) that has a primary coverage band and a capacity coverage band, user device 210 may compare the primary coverage bands to the second set of RF spectrum bands to determine whether the second set of RF spectrum bands matches a primary coverage band (e.g., a matching primary coverage band). Additionally, or alternatively, user device 210 may compare the capacity coverage bands to the second set of RF spectrum bands to determine whether the second set of RF spectrum bands matches a capacity coverage band (e.g., a matching capacity coverage band). In some implementations, service management device 230 may determine whether user device 210 and VPMN 260 support the same RF spectrum band based on comparing the first set of RF spectrum bands and the second set of RF spectrum bands.

As further shown in FIG. 4, if the user device and the VPMN support the same RF spectrum band for the first RAT (block 440—YES), then process 400 may include registering the user device to use the first RAT on the VPMN (block 450). For example, if user device 210 determines that user device 210 and VPMN 260 support the same RF spectrum band, then user device 210 may determine to register to use the first RAT on VPMN 260. In some implementations, user device 210 may determine to register to use the first RAT based on VPMN 260 and user device 210 supporting the same RF spectrum band when the same RF spectrum band is a matching primary coverage band (e.g., for an LTE RAT). In some implementations, user device 210 may determine to register to use the first RAT based on VPMN 260 and user device 210 supporting the same RF spectrum band when the same RF spectrum band is a matching primary coverage band and/or a matching capacity coverage band.

In some implementations, user device 210 may determine to use the first RAT for a first service (e.g., a data service), and not for a second service (e.g., a voice service) based on the RF spectrum bands supported by VPMN 260 and user device 210. For example, user device 210 may determine to use an LTE RAT for a data service, and a GSM RAT for a voice service when user device 210 and VPMN do not have a matching primary coverage band, but have a matching capacity coverage band. In some implementations, service management device 230 may determine to allow user device 210 to register for the first RAT and/or a service associated with the first RAT.

Additionally, or alternatively, user device 210 and/or service management device 230 may receive information identifying a coverage area for the first RAT (e.g., a geographic area in which user device 210 can receive signals for the first RAT from base station 220). In this case, user device 210 and/or service management device 230 may compare the coverage area to a geographic location of user device 210 to determine whether to use the first RAT. For example, when user device 210 is at a location close to a boundary of the coverage area, user device 210 or service management device 230 may determine not to use the first RAT.

In some implementations, before user device 210 sends a request to register, user device 210 may exchange, with HPMN 270 and/or VPMN 260, information associated with attaching to VPMN 260 and using services associated with VPMN 260 (e.g., services supported, an APN, etc.).

If service management device 230 determines that user device 210 is going to use the first RAT, then service management device 230 registers user device 210 for the RAT on VPMN 260. In this case, user device 210 may already have sent a request to register, which caused service management device 230 to identify the first set of RF spectrum bands, as described above. Service management device 230 may complete the registration process (e.g., sending a message to complete registration, instead of sending a message to disconnect from the registration process). For example, if user device 210 already sent a request to register for VoLTE, then service management device 230 may reply to the request with a message that includes information that user device 210 needs to complete registration for VoLTE services. By determining to register user device 210 for the first RAT when user device 210 and VPMN 260 support the same RF spectrum, user device 210 may use a service associated with the first RAT that is of a higher quality than services associated with another RAT.

As further shown in FIG. 4, if the user device and the VPMN do not support the same RF spectrum band for the first RAT (block 440—NO), then process 400 may include registering the user device to use a second RAT on the VPMN (block 460). For example, if user device 210 determines that user device 210 does not support the same RF spectrum band as VPMN 260, then user device 210 may register for a second RAT. In some implementations, the first RAT may be a 4G RAT (e.g., an LTE RAT), and the second RAT may be a 2G RAT (e.g., a GSM RAT), a 3G RAT (e.g., a UMTS RAT), or the like. Additionally, or alternatively, the second RAT may be based on a network with fewer alternative RF spectrum bands (e.g., a GSM service or a UMTS service). In other words, the second RAT may provide lower quality of service, but may use an RF spectrum band supported by user device 210. In some implementations, user device 210 may ensure that user device 210 is compatible with the second RAT prior to registering to use the second RAT service. If user device 210 determines not to use the first RAT, as described above, then user device 210 may register for the second RAT using registration procedures associated with the second RAT.

In some implementations, if service management device 230 determines that user device 210 is going to use the second RAT, then service management device 230 may send a message rejecting the request to register for a service associated with the first RAT (sent by user device 210 as described above), and may send user device 210 a command to register to use a service associated with the second RAT. In this case, service management device 230 may determine if user device 210 is capable of using the service associated with the second RAT by sending, to subscriber information device 240, a message, with the user device identity, to identify if user device 210 is capable of using the second RAT service.

Implementations described herein allow a user device 210 to determine whether user device 210 will use the first RAT or the second RAT by comparing RF spectrum bands supported by VPMN 260 for the first RAT to RF spectrum bands supported by user device 210. By determining whether to use the first RAT to communicate via VPMN 260, user device 210 saves processor and network resources associated with having to switch from one RAT to another RAT mid-call. Furthermore, the risk of losing a call is reduced, and the best possible quality of service can be provided to user device 210 by allowing higher quality RAT services to be used when possible based on the comparison of RF spectrum bands.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein allow a user device or a network device to determine whether the user device will use a particular RAT, such as an LTE RAT, when roaming on a visited public mobile network (VPMN) by comparing RF spectrum bands supported by the VPMN to RF spectrum bands supported by the user device. By determining whether to use the particular RAT to communicate via the VPMN, the user device (or the network device) saves processor and network resources associated with having to switch from one RAT to another mid-call. Furthermore, the risk of losing a call is reduced, and the best possible quality of service can be provided to the user device by allowing higher quality RAT services (e.g., a voice over LTE (VoLTE) service) to be used when efficient and possible based on the comparison of RF spectrum bands supported by the user device and RF spectrum bands supported by the VPMN.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A user device, comprising:
a memory storing instructions; and
one or more processors to execute the instructions to:
send a request, to a base station, for attaching to a visited public mobile network (VPMN);
receive, based on the request, information identifying a first set of radio frequency (RF) spectrum bands supported by the VPMN for a first radio access technology (RAT),
the first set of RF spectrum bands comprising a primary coverage band and a capacity coverage band;
identify a second set of RF spectrum bands supported by the user device for the first RAT;
compare the first set of RF spectrum bands and the second set of RF spectrum bands;
determine whether the second set of RF spectrum bands match at least one of the primary coverage band or the capacity coverage band based on comparing the first set of RF spectrum bands and the second set of RF spectrum bands; and
selectively register the user device to use at least one of the first RAT or a second RAT of the VPMN for a service based on determining whether the second set of RF spectrum bands match at least one of the primary coverage band or the capacity coverage band,
the user device being registered to use the first RAT for a first service and the second RAT for a second service when the second set of RF spectrum bands do not match the primary coverage band and match the capacity coverage band.

2. The user device of claim 1, where the first RAT includes a Long-Term Evolution (LTE) RAT and the second RAT includes at least one of:
a Global System for Mobile Communication (GSM) RAT, or
a Universal Mobile Telecommunications System (UMTS) RAT.

3. The user device of claim 1, where the one or more processors, when receiving the information identifying the first set of RF spectrum bands, are to:
receive the information identifying the first set of RF spectrum bands based on information broadcast by a network device of the VPMN; and
where the one or more processors are further to:
identify the first set of RF spectrum bands based on receiving the information identifying the first set of RF spectrum bands.

4. The user device of claim 1, where the one or more processors, when selectively registering the user device to use the first RAT or the second RAT, are to:
receive, via the VPMN, a message rejecting the request to register for the first RAT; and
receive, via the VPMN, a command instructing the user device to register for the second RAT.

5. The user device of claim 1, where the one or more processors are further to:
send, via the VPMN, a user device identifier; and
where the one or more processors, when identifying the second set of RF spectrum bands, are to:
identify the second set of RF spectrum bands based on the user device identifier.

6. The user device of claim 1, where:
the first service is a voice over LTE (VoLTE) service; and
the second service is a GSM voice service.

7. The user device of claim 1, where:
the primary coverage band is used for communications; and
the capacity coverage band is used to increase capacity for the communications.

8. The user device of claim 3, where the network device of the VPMN is the base station.

9. A non-transitory computer-readable medium storing instructions, the instructions comprising:
one or more instructions that, when executed by one or more processors of a user device, cause the one or more processors to:
send a request, to a base station, for attaching to a visited public mobile network (VPMN);
receive, based on the request, information identifying a first set of radio frequency (RF) spectrum bands for a first radio access technology (RAT) associated with the VPMN with which the user device is roaming,
the first set of RF spectrum bands comprising a primary coverage band and a capacity coverage band;
identify a second set of RF spectrum bands supported by the user device for the first RAT;
compare the first set of RF spectrum bands and the second set of RF spectrum bands;
determine whether the second set of RF spectrum bands match at least one of the primary coverage band or the capacity coverage band based on comparing the first set of RF spectrum bands and the second set of RF spectrum bands; and
selectively register the user device to use at least one of the first RAT or a second RAT of the VPMN for a service based on determining whether the second set of RF spectrum matches at least one of the primary coverage band or the capacity coverage band,
the user device being registered to use the first RAT for a first service and the second RAT for a second service when the second set of RF spectrum bands do not match the primary coverage band and match the capacity coverage band.

10. The non-transitory computer-readable medium of claim 9, where the one or more instructions, that cause the one or more processors to identify the second set of RF spectrum bands, cause the one or more processors to:
identify the second set of RF spectrum bands based on information stored by the user device.

11. The non-transitory computer-readable medium of claim 9, where the one or more instructions, that cause the one or more processors to compare the first set of RF spectrum bands and the second set of RF spectrum bands, cause the one or more processors to:
identify a first RF spectrum band, included in the first set of RF spectrum bands, that matches a second RF spectrum band included in the second set of RF spectrum bands.

12. The non-transitory computer-readable medium of claim 9, where the one or more instructions, that cause the one or more processors to receive the information identifying the first set of RF spectrum bands, cause the one or more processors to:

receive the information identifying the first set of RF spectrum bands based on information broadcast by a network device of the VPMN; and where the one or more instructions, when executed by executed by the one or more processors, further cause the one or more processors to:
identify the first set of RF spectrum bands based on receiving the information identifying the first set of RF spectrum bands.

13. The non-transitory computer-readable medium of claim 9, where the one or more instructions, when executed by the one or more processors, further cause the one or more processors to:
determine a VPMN identifier that identifies the VPMN;
search a data structure, using the VPMN identifier, to identify the first set of RF spectrum bands; and
identify the first set of RF spectrum bands based on searching the data structure.

14. The non-transitory computer-readable medium of claim 9, where the one or more instructions, when executed by the one or more processors, further cause the one or more processors to:
send, via the VPMN, a user device identifier; and
where the one or more instructions, that cause the one or more processors to identify the second set of RF spectrum bands, cause the one or more processors to:
identify the second set of RF spectrum bands based on sending the user device identifier.

15. A method, comprising:
sending, by a user device and to a base station, a request for attaching to a visited public mobile network (VPMN);
receiving, by the user device and based on the request, information identifying a first set of radio frequency (RF) spectrum bands supported by the VPMN, visited by the user device, for a first radio access technology (RAT),
the first set of RF spectrum bands comprising a primary coverage band and a capacity coverage band;
identifying, by the user device, a second set of RF spectrum bands supported by the user device for the first RAT;
comparing, by the user device, the first set of RF spectrum bands, associated with the VPMN, and the second set of RF spectrum bands associated with the user device;
determining, by the user device, whether the second set of RF spectrum bands match at least one of the primary coverage band or the capacity coverage band based on comparing the first set of RF spectrum bands and the second set of RF spectrum bands; and
selectively causing, by the user device, a connection to be established between the user device and the VPMN using at least one of the first RAT or a second RAT based on determining whether the second set of RF spectrum bands match at least one of the primary coverage band or the capacity coverage band,
the connection being established between the user device and the VPMN using the first RAT for a first service and the second RAT for a second service when the second set of RF spectrum bands do not match the primary coverage band and match the capacity coverage band.

16. The method of claim 15, where the first RAT is a Long-Term Evolution (LTE) RAT.

17. The method of claim 15, where the first service is established for a data service; and
where the second service is a voice service.

18. The method of claim 15, further comprising:
determining whether the user device and the VPMN support a same RF spectrum band for the first RAT based on comparing the first set of RF spectrum bands and the second set of RF spectrum bands; and
registering the user device to use the first RAT based on determining that the user device and the VPMN support the same RF spectrum band.

19. The method of claim 15, further comprising:
determining a coverage area associated with the first RAT and the VPMN;
determining a geographic location associated with the user device; and
determining whether the user device is to connect to the VPMN using the first RAT or the second RAT based on the coverage area and the geographic location and based on comparing the first set of RF spectrum bands and the second set of RF spectrum bands.

20. The method of claim 15, where the user device is not subscribed to the VPMN.

* * * * *